US008849834B2

(12) United States Patent  
Milby (10) Patent No.: US 8,849,834 B2  
(45) Date of Patent: Sep. 30, 2014

(54) TECHNIQUES FOR ORGANIZING SINGLE OR MULTI-COLUMN TEMPORAL DATA IN R-TREE SPATIAL INDEXES (75) Inventor: Gregory Howard Milby, San Marcos, CA (US)

(73) Assignee: Teradata US, Inc., Dayton, OH (US)

( * ) Notice: Subject to any disclaimer, the term of this patent is extended or adjusted under 35 U.S.C. 154(b) by 293 days.

(21) Appl. No.: 12/956,894

(22) Filed: Nov. 30, 2010

(65) Prior Publication Data

US 2012/0136874 A1 May 31, 2012

(51) Int. Cl.  
*G06F 17/30* (2006.01)  
*G06F 7/00* (2006.01)

(52) U.S. Cl.  
USPC ........................................................ 707/743

(58) Field of Classification Search  
USPC ........................................................ 707/743  
See application file for complete search history.

(56) References Cited

U.S. PATENT DOCUMENTS

| 7,728,758 | B2 | 6/2010 | Varadarajan et al. |
| 2002/0141643 | A1* | 10/2002 | Jaeger ........................... 382/181 |
| 2005/0149251 | A1* | 7/2005 | Donath et al. ................. 701/200 |
| 2008/0147603 | A1 | 6/2008 | Kostamaa et al. |
| 2008/0218384 | A1 | 9/2008 | Varadarajan et al. |
| 2010/0098289 | A1 | 4/2010 | Tognoli et al. |
| 2010/0211306 | A1 | 8/2010 | Varadarajan et al. |

\* cited by examiner

*Primary Examiner* — Kuen Lu  
(74) *Attorney, Agent, or Firm* — Sehwegman, Lundberg & Woessner, P.A.; Ramin Mahboubion (57) ABSTRACT Techniques for organizing single or multi-column temporal data into R-tree spatial indexes are provided. Temporal data for single or multiple column data, within a database system, is converted into one or more line segments. The resulting line segments are transformed into a minimum bounding rectangle (MBR). Finally, the MBR is inserted into an R-tree spatial index.

27 Claims, 5 Drawing Sheets

TECHNIQUES FOR ORGANIZING SINGLE OR MULTI-COLUMN TEMPORAL DATA IN R-TREE SPATIAL INDEXES

BACKGROUND

Most modern commercial database products support a database table column indexing mechanism that enables rows of the database to be retrieved more efficiently via a search condition executed against the table's indexed column. For scalar data, an index search key is usually the same scalar value as that which is found in the table's column being indexed.

Most databases store indexing data the same way that they store the primary data being indexed; more specifically, via an extendible-hash-based approach. The search key if first hashed, and then the resultant hash result is used to determine where to store the indexing data within the file system. Although the extendible-hash approach works well for scalar data types, it is unable to support more complex data types, such as spatial data types, full-text data types, and temporal data types. For these data types, another approach is required.

Recently, temporal data types have been introduced into the American National Standards Institute (ANSI) Structured Query Language (SQL) Standard. Temporal data types are non-scalar complex data types characterized by having two attributes signifying "beginning" and "ending" points in time, which when taken together represent a time continuum or time segment. SQL operations that can be performed against temporal data types include such things as: PRECEDES, SUCCEEDS, MEETS, CONTAINS, and OVERLAPS.

It would be beneficial, with respect to query performance, to be able to build secondary indexes on temporal data type columns. Such a technique is presently not available in the industry.

SUMMARY

In various embodiments, techniques for organizing single or multi-column temporal data in R-Tree Spatial Indexes are presented. According to an embodiment, a method for organizing column temporal data in an R-Tree Spatial Index is provided. Specifically,

DETAILED DESCRIPTION

Figure 1A:
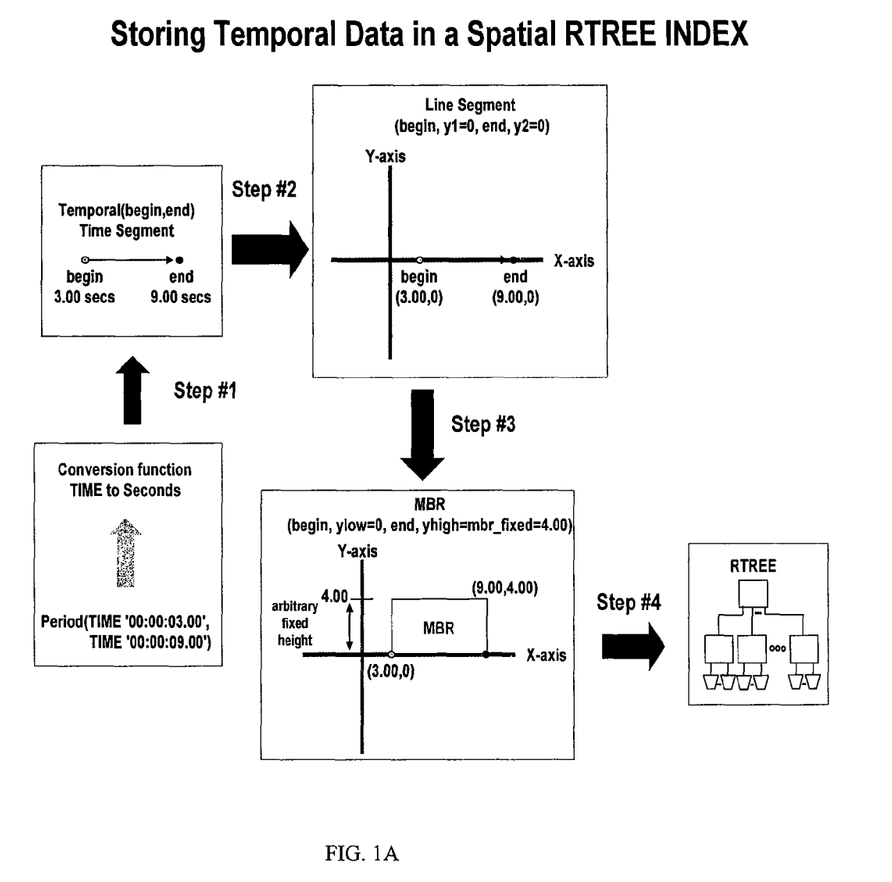
FIG. 1A is an example illustration for storing temporal data in an R-Tree Spatial Index, according to an example embodiment.
Figure 1B:
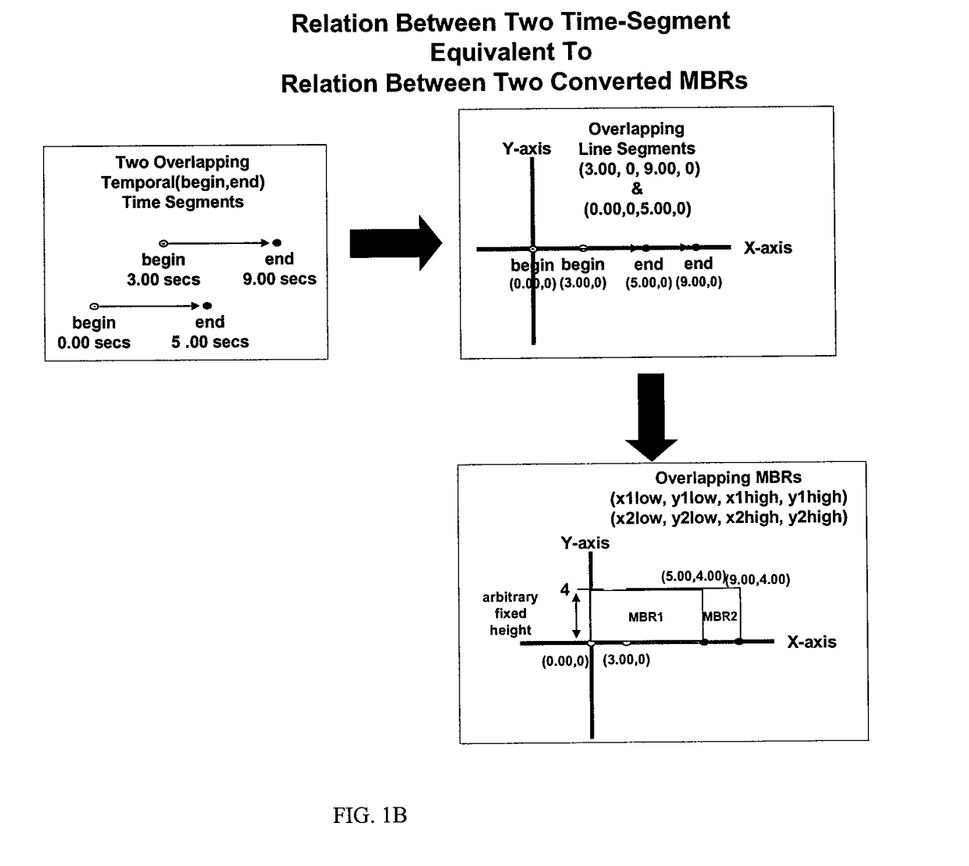
FIG. 1B is an example illustration for relation between two time-segments made equivalent to two minimum bounding rectangles, according to an example embodiment.

FIG. 1A is an example illustration for storing temporal data in an R-Tree Spatial Index, according to an example embodiment. FIG. 1B is an example illustration for relation between two time-segments made equivalent to two minimum bounding rectangles, according to an example embodiment.

FIGS. 1A-B are presented within the context the discussion that follows for a specific example of converting column temporal data. This example is presented for illustrative purposes only and it is noted that the techniques presented herein are not limited to the specific conversion algorithms and specific data for the example illustration. That is, other conversion algorithms and other specific situations can be used to translate spatial data (such as temporal data) into line segments that are them mapped to minimum bounding rectangles (MBRs) and stored in an R-Tree (MBR Tree).

More specifically, the techniques presented here provide mechanisms for representing time segments (temporal data) as geometric line segments that are then converted to MBRs and stored as spatial indexes within an R-Tree.

It is within this context that the illustrative algorithms and examples are now presented with reference to the FIGS. 1A-B.

Temporal data types, also known as, period data types, are characterized by having a beginning and ending time point or boundary. The beginning boundary is inclusive, and the ending boundary is exclusive; that is, a date time range starts at the beginning boundary and extends up to but not including the ending boundary. In commercial databases, such as Teradata®, temporal data types can be based on the: DATE, TIME, or TIMESTAMP data type, meaning that the beginning and ending boundary time points can be of data type: DATE, TIME, or TIMESTAMP.

Examples of Temporal/Period Data Types

DATE Period Type: PERIOD(DATE '2005-02-03', DATE '2006-02-04').

TIME Period Type: PERIOD(TIME '12:12:12.123', TIME '12:20:12.234').

TIMESTAMP Period Type: PERIOD(TIMESTAMP '2006-02-03 12:00:03.00', TIMESTAMP '2006-02-04 12:00:09.00').

Mechanism for Storing Temporal Data within a Spatial R-Tree

The mechanisms described herein use several steps to convert a time segment (temporal data), represented by a beginning and ending time-point, into a representative geometric line-segment, which is then converted into an MBR that can then be stored within an R-Tree spatial index.

The techniques presented herein ensures that: "given two distinct temporal values, Period1 and Period2, both the intermediary line-segments, and final resulting MBRs maintain the same relationship in space that the Period1 and Period 2 values had in time". Meaning that, if:

1) Period1 OVERLAPS Period2, then line-segment1 overlaps line-segment2; and
2) Period1 OVERLAPS Period2, then MBR1 overlaps MBR2.

The approaches presented support indexing 1 to N distinct temporal columns from the same base table. So, when the temporal index is created, it can be declared to cover from 1 to N temporal columns from the same source base table. Support for N columns is accomplished by strategically assigning the value of the y-axis for the converted line-segments, and by strategic spacing of the MBRs along the y-axis for the converted MBRs. For a given column, the y-axis values associated with all indexed entries are the same. This is further explained in the Conversion process described below.

The conversion process, from a time-segment to a MBR is described below, as well as illustrated in the FIGS. 1A-B.

Conversion Step 1

Convert each of the beginning and ending time points into a numeric value.

The example formulas below convert the beginning and ending time-points of the temporal data value into a set of 64-bit floating point numbers. It is noted that formulas (algorithms) other than those shown below may also be applied, as long as the result is a numeric representation that retains the segment length relationship between the starting and ending points:

Converting a DATE Data Type to a Number

Example of DATE conversion: DATE—made up of YEAR, MONTH, and DAY.

An example formula can appear as follows: (YEAR−1900) *10000+(MONTH*100)+DAY to convert to a 64 bit floating point value.

So, Period(DATE '2005-02-03', DATE '2005-02-04') becomes:

Beginning=(2005−1900)*10000+(2*100)+3=1050203

Ending=(2005−1900)*10000+(2*100)+4=1050204

Answer: Period_Time_Segment(1050203.0, 1050204.0)

Converting TIME Data Type to a Number

Example of TIME conversion: TIME—made up of HOUR, MINUTE, and SECOND.

An example formula can appear as follows: (HOUR*60*60)+(MINUTE*60)+SECOND to convert to a 64 bit floating point value.

So, Period(TIME '00:00:03.00', TIME '00:00:09.00') becomes:

Beginning=(0*60*60)+(0*60)+3.00=3.00

Ending=(0*60*60)+(0*60)+9.00=9.00

Answer: Period_Time_Segment (3.00,9.00)

Converting TIMESTAMP Data Type to a Number

Example of TIMESTAMP conversion: TIMESTAMP— made up of YEAR, MONTH, DAY, HOUR, MINUTE, and SECOND.

An example formula can appear as follows:
First, calculate the Julian Day Number (JDN):

JDN=367×$Y$−(7×($Y$+5001+($M$−9)/7))/4+(275×$M$)/9+ $D$+1729777.

Second, calculate the Julian Date:

JD=JDN+(HOUR−12)/24+minute/1440+second/ 86400.

Third, calculate the Lilian Day Number (LDN):

LDN=floor (JD−2299160.5).

Finally, calculate the Lilian seconds:

Lilian Seconds=LDN*24*60*60.

So, Period(TIMESTAMP '2006-02-03 12:00:03.00', TIMESTAMP '2006-02-04 12:00:04.00') becomes:

Beginning JDN=367×2006−(7×(2006+5001+(2−9)/ 7))/4+(275×2)/9+3+ 1729777=2453782.6111111111111111111111111.

Beginning JD=JDN+(12−12)/24+0/1440+3/ 86400=2453782.61114583333333333333333333.

Beginning LDN=floor (JD−2299160.5) =154622.11114583333333333333333333.

Beginning Lilian- seconds=LDN*24*60*60=13359350403.0

Ending JDN=367×2006−(7×(2006+5001+(2−9)/7))/ 4+(275×2)/9+4+ 1729777=2453783.6111111111111111111111111.

Ending JD=JDN+(12−12)/24+0/1440+4/ 86400=2453783.61115740740740740740740740

Ending LDN=floor (JD−2299160.5) =154623.11115740740740740740740741.

Ending Lilian- seconds=LDN*24*60*60=13359436804.0.

Answer: Period_Time_Segment (13359350403.0, 13359436804.0).

Conversion Step 2

Convert the time segment into a geometric line segment.

The numeric value for the beginning and ending time points becomes the beginning and ending x-axis values of the line segment. The y-axis values are fixed relative to index entries made on behalf of each distinct column. The actual y-axis values assigned are strategically and arbitrarily assigned, and depend on the number of the columns being supported by the index. For single column indexes, the y-axis value is set to 0 for all associated index entries. If more than one temporal column (N-columns) is being supported, then the y-axis values for the Nth column is set according to the following formula (Note: Column number begins at 1 and continues up to N):

$Y$_axis_base value for $N$th Column=(Column#−1)×2× (Fixed_MBR_Height).

Example: For a fixed MBR height of 4, the formula becomes: (Column#−1)×2×4, so:

For Column 1: 0×2×4=0, so $y$_axis_base=0 for all index entries for this column.

For Column 2: 1×2×4=8, so $y$_axis_base=8 for all index entries for this column.

For Column 3: 2×2×4=16, so $y$_axis_base=16 for all index entries for this column.

Etc.

Single Column Example

Step 1 Conversion: Convert Beginning and Ending time-points to numeric values.

Given a Beginning TIME of 0 HOUR 0 MINUTE 3.00 SECOND, convert beginning time-point to decimal numeric value:=(0*60*60)+(0*60)+ 3.00=3.00.

Given an Ending TIME of 0 HOUR 0 MINUTE 9.00 SECOND,convert ending time-point to a decimal numeric value:=(0*60*60)+(0*60)+9.00=9.00.

Step 2 Conversion: Convert to a line segment:

Starting point$(x,y)$=(3.00,0.00);Ending point$(x,y)$= (9.00,0.00).

Answer: Line_Segment=Line$(x1,y1,x2,y2)$=Line(3.00, 0.00,9.00,0.00).

It is to be noted that: given two line-segments, the spatial relationship between the two line-segments is equivalent to the time relationship between the two converted time-segments. Meaning that if the time-segments overlapped in time, then the corresponding line-segments overlap in space; and, that if one time segment precedes another in time, then the corresponding line-segment precedes the other line-segment in space, etc.

Conversion Step 3

Convert the line segment into a MBR of fixed height.

Once the time-segment has been converted to a corresponding line-segment, the next step is to convert the line-segment into an MBR.

For a given 1-to-N Column Temporal Index, the height of the MBR is assigned a fixed value relative to that index. The height is an arbitrarily chosen number. For the explanation below, the assumption is that the height of the MBR is set to a fixed value of 4.

An MBR is described by a pair of diagonally opposed points: MBR{(Xlow, Ylow), (Xhigh, Yhigh)}, where (Xlow, Ylow) signifies the low point (lower left corner); and, (Xhigh, Yhigh) signify the high point (upper right corner).

An formula for translating a line-segment into a MBR can be written as:

Given that:

From discussion above, $Y\_axis_{13}$ base value for $N$th Column=(Column#−1)×2×(Fixed_M-BR_Height).

And, Line_Segment=Line$(x1,y1,x2,y2)$

Then:

MBR{$(Xlow, Ylow), (Xhigh, Yhigh)$}=MBR{$(Xlow=x1, Ylow=y\_axis\_base), (Xhigh=x2, Yhigh=y\_axis\_base+Fixed\_MBR\_Height)$}

As an example, consider:

Line_Segment=Line$(x1,y1,x2,y2)$=Line(3.00,0.00, 9.00,0.00) with a Fixed_MBR_Height=4;

the associated MBR would be: MBR{(3.00,0.00),(9.00, 4.00)}.

Step 4

Store the MBR in an R-Tree (Spatial Index).

After the temporal time-segment has been converted into a MBR, it can then be stored within an R-tree spatial index. It can be stored such that the R-tree has a single top-level node that branches out to M-sub-trees. The R-tree navigational logic decides under which sub-tree to store the MBR.

This invention enables commercial database vendors to incorporate use an R-tree spatial index to store temporal index values.

FIG. 1A shows how the example presented above stores temporal data in a Spatial R-Tree index. FIG. 1B shows how the example presented above creates a relation between two time segments to an equivalent relation between two converted MBRs.

The techniques presented herein provide a variety of benefits that heretofore have not been feasible in the industry, some of which include:

1) Enabling commercial database vendors to incorporate use of an R-Tree spatial index for purposes of storing temporal index values.
2) Incorporation of a temporal index into commercial databases enables temporal queries to operate with improved performance with regards to accessing database rows via temporal predicates and joining of database tables on a temporal bind condition.
3) Providing a mechanism by which a temporal time-segment can be translated into geometric line segment and further translated into a MBR, enabling the temporal data to be stored within a spatial R-tree.
4) Supporting of storing indexing data from either a single temporal column or multi-temporal-columns within a single R-tree.

Figure 2:
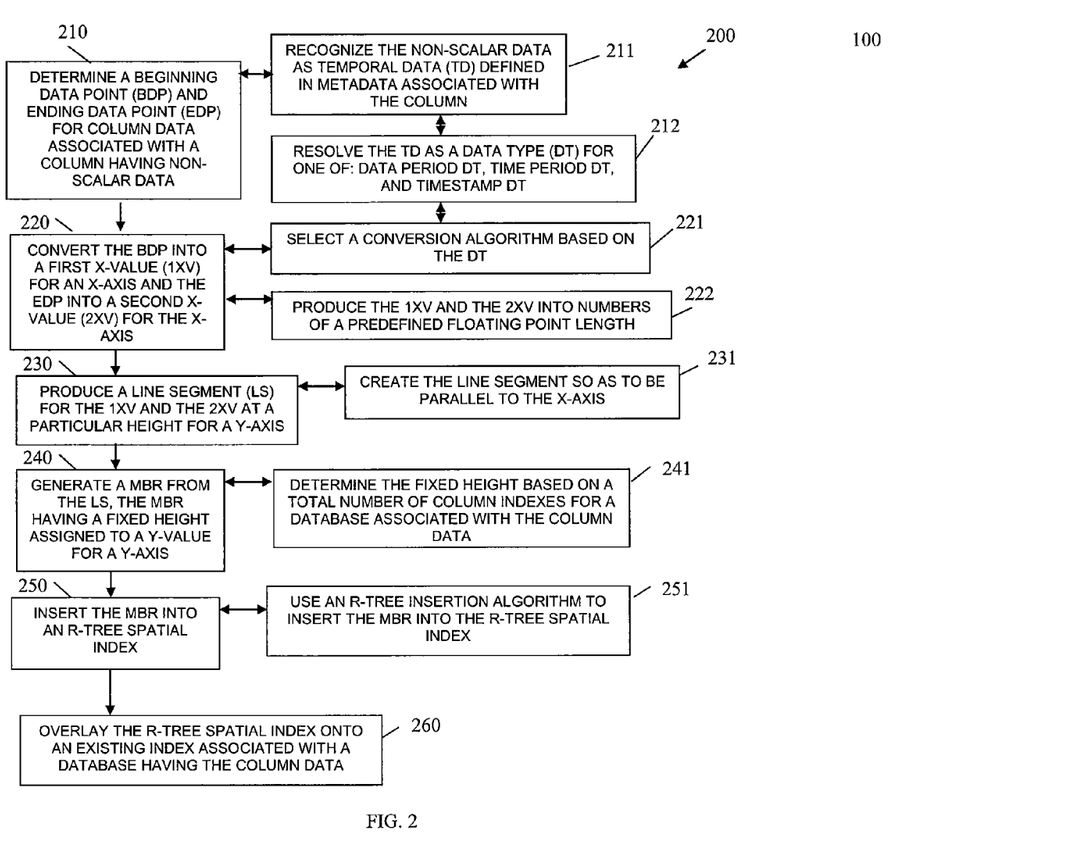
FIG. 2 is a diagram of a method for organizing column temporal data in an R-Tree Spatial Index, according to an example embodiment.

FIG. 2 is a diagram of a method 200 for organizing column temporal data in an R-Tree Spatial Index, according to an example embodiment. The method 200 (hereinafter "database index conversion service") is implemented as instruction within a computer-readable storage medium that execute on a plurality of processors, the processors specifically configured to execute the database index conversion service. Moreover, the database index conversion service is programmed within a non-transitory computer-readable storage medium. The database index conversion service may also be operational over a network; the network is wired, wireless, or a combination of wired and wireless.

At 210, the database index conversion service determines a beginning and ending data point for column data associated with a column having non-scalar data. That is, the column data is spatial data. The column data is associated with a column of a database table.

According to an embodiment, at 211, the database index conversion service recognizes the non-scalar data as temporal data defined in metadata associated with the column. Here, the metadata may include a schema for a database table associated with the column data or the database. In another case, the metadata is acquired as database statistics for the column.

Continuing with the embodiment of 211 and at 212, the database index conversion service resolves the temporal data as a data type for a data period data type, a time period data type, or a timestamp data type. Examples of these data types and their corresponding definitions were provided above with reference to the FIGS. 1A-B.

At 220, the database index conversion service converts the beginning data point into a first x-value for an x-axis and the ending point value into a second x-value from the x-axis. A variety of conversions can be used, some example techniques depending upon the data types for the non-scalar data were provided above with reference to the FIGS. 1A-B.

In an embodiment, at 221 and continuing with the embodiment of 212, the database index conversion service sects a conversion algorithm based on the data type. So, the specific conversion algorithm is selected or chosen based on the data type to acquire the first x-vale and the second x-value.

According to an embodiment, at 222, the database index conversion service produces the first x-value and the second x-value as numbers having a predefined floating point length. In other words, the size of the x-values can be a processing parameter to the conversion processing or even to the conversion algorithms selected in the embodiment described above with reference to the processing at 221.

At 230, the database index conversion service process a line segment for the first x-value and the second x-value at a particular height for the y-axis. That is, the value to elevate the line segment above the x-axis is a y-value on the y-axis and the y-value is selected to a predefined or a particular height.

According to an embodiment, at 231, the database index conversion service creates the line segment so that the line segment is parallel to the x-axis and evaluated to the y-axis value. So, the slope of the line segment is equal to zero.

At 240, the database index conversion service generates a MBR from the line segment. The MBR has a fixed height assigned to a y-value for the y-axis. Examples for determine the MBR and the fixed height were presented above with reference to the discussion associated with the FIGS. 1A-B.

In an embodiment, at 241, the database index conversion service determines the fixed height based on a total number of column indexes for a database associated with the column data. In other words, there can be multiple line segments within the MBR each occurring at a particular height on the y-axis, such that the total height of the MBR is equal to or computed based on the total number of line segments or indexes.

At 250, the database index conversion service inserts the MBR into an R-tree spatial index. Again, examples of this were presented above with respect to the discussion of the FIGS. 1A-B.

In an embodiment, at 251, the database index conversion service uses an R-Tree insertion algorithm to insert the MBR into the R-Tree spatial index.

In another situation, at 260, the database index conversion service overlays the R-Tree spatial index into an existing index associated with a database having the column data. That is, multiple indexes can exist and be used for the same column data of which one is the R-tree spatial index having the line segment, which is represented of the non-scalar data of the column data.

Figure 3:
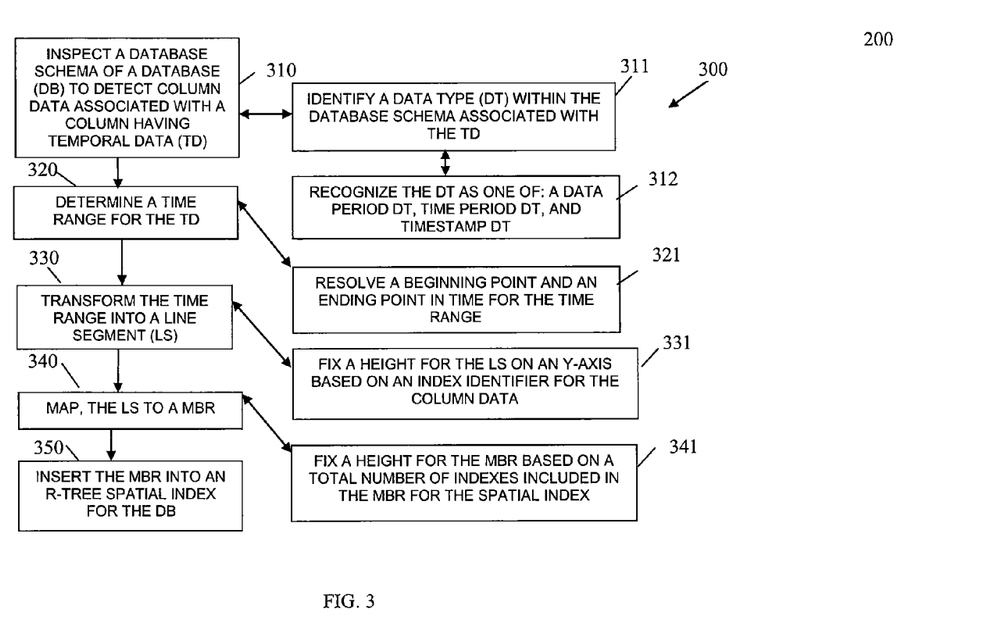
FIG. 3 is a diagram of another method for organizing column temporal data in an R-Tree Spatial Index, according to an example embodiment.

FIG. 3 is a diagram of another method 300 for organizing column temporal data in an R-Tree Spatial Index, according to an example embodiment. The method 300 (hereinafter "index conversion service") is implemented as instruction within a computer-readable storage medium that execute on a plurality of processors, the processors specifically configured to execute the index conversion service. Moreover, the index conversion service is programmed within a non-transitory computer-readable storage medium. The index conversion service may also be operational over a network; the network is wired, wireless, or a combination of wired and wireless.

The index conversion service presents another in some cases enhanced perspective of the database index conversion service represented by the method 200 of the FIG. 2.

At 310, the index conversion service inspects a database schema of a database to detect column data associated with a column having temporal data. The schema represents metadata defining the attributes of the database including the column. This allows the index conversion service to identify the column as having spatial data, which is the temporal data.

According to an embodiment, at 311, the index conversion service identifies a data type within the database schema that is associated with the temporal data. That is, different types of temporal data can exist.

For example, at 312, the index conversion service recognizes the data type as: a data period type, a time period data type, or a timestamp data type. Again, these data types were discussed above with reference to the discussion of the FIGS. 1A-B.

At 320, the index conversion service determines a time range for the temporal data. That is, the temporal data is spatial having a beginning and ending point.

So, as an example, at 321, the index conversion service resolves a beginning point in time and an ending point in time for the time range.

At 330, the index conversion service transforms the time range into a line segment. Techniques for achieving this were described above with reference to the discussion of the FIGS. 1A-B and the FIG. 2.

According to an embodiment, at 331, the index conversion service fixes a height for the line segment on an y-axis based on an index identifier for the column data. In other words, a calculation, such as what was described above with reference to the FIGS. 1A-B, is used based on a column identifier to resolve a specific height for the line segment. Again, the line segment in X-Y space has a slope of zero; in other words, the line segment is parallel to the x-axis.

At 340, the index conversion service maps the line segment to an MBR.

In one situation, at 341, the index conversion service fixes the height for the MBR based on a total number of indexes included in the MBR for the spatial index. That is, multiple different line segments can be present within the MBR portions of which overlap along the x-axis and each of which are at different heights above the x-axis along the y-axis.

Finally, at 350, the index conversion service inserts the MBR into an R-Tree spatial index for the database. At this point, temporal based database search operations can be performed against the column data.

Figure 4:
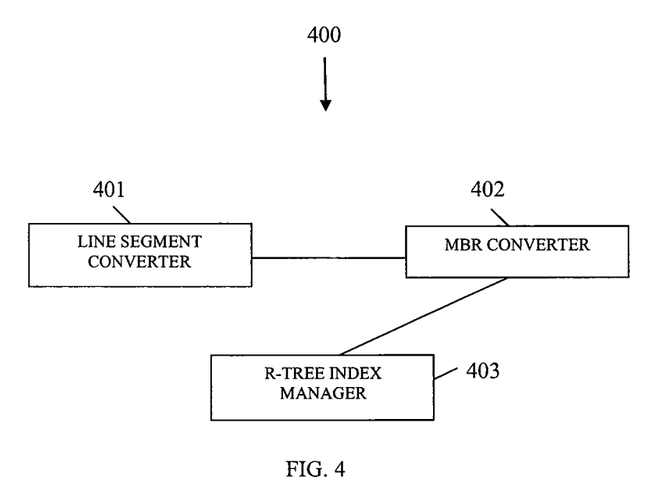
FIG. 4 is a diagram of a column data R-Tree Spatial Index conversion system, according to an example embodiment.

FIG. 4 is a diagram of a column data R-Tree Spatial Index conversion system 400, according to an example embodiment. The column data R-Tree Spatial Index conversion system 400 is implemented, resides, and is programmed within a non-transitory computer-readable storage medium and executes on one or more processors specifically configured to execute the components of the column data R-Tree Spatial Index conversion system 400. Moreover, the column data R-Tree Spatial Index conversion system 400 may be operational over a network and the network is wired, wireless, or a combination of wired and wireless.

The column data R-Tree Spatial Index conversion system 400 implements, inter alia, the techniques presented and described above with reference to the FIGS. 1A-B and FIGS. 2-3.

The column data R-Tree Spatial Index conversion system 400 includes a line segment converter 401, an MBR converter 402, and an R-Tree manager 403. Each of these and their interactions with one another will now be discussed in turn.

The line segment converter 401 is programmed within a non-transitory computer-readable medium and executes on a processor. Example aspects of the line segment converter 401 were presented above with reference to the FIGS. 1A-B and the FIGS. 2-3.

The line segment converter 401 is configured to convert column data associated with spatial data of a database into a line segment.

According to an embodiment, the line segment converter 401 is configured to resolve a beginning point and an ending point within the spatial data. The line segment converter 401 resolves a height for the line segment based on an index identifier for the temporal data.

In an embodiment, the spatial data is temporal data.

The MBR converter 402 is programmed within a non-transitory computer-readable storage medium that executes on the processor. Example aspects or features of the MBR converter 402 were presented above with reference to the FIGS. 1A-B and the FIGS. 2-3.

The MBR converter 402 is configured to convert the line segment into a MBR.

The R-Tree manager 403 is programmed within a non-transitory computer-readable storage medium that executes on the processor. Example aspects or features of the R-Tree manager 403 were presented above with reference to the FIGS. 1A-B and the FIGS. 2-3.

The R-Tree manager 403 is configured to insert the MBR into an R-Tree spatial index for the database.

According to an embodiment, the R-tree spatial index is overlaid onto one or more existing indexes associated with the database.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by a processor, the processor configured to execute the method, comprising:
    determining, via the processor, a beginning and an ending data point in time for column data associated with a column of data stored in a database, including non-scalar data recognizable as temporal data also stored in the database;
    converting, via the processor, the beginning data point into a first x-value for an x-axis and the ending data point into a second x-value for the x-axis;
    producing, via the processor, a line segment for the first x-value and the second x-value at a particular height for a y-axis;
    generating, via the processor, a minimum bounding rectangle (MBR) from the line segment, the MBR having a fixed height assigned to a y-value for the y-axis; and
    inserting, via the processor, the MBR into an R-tree spatial index.

2. The method of claim 1, wherein determining further includes recognizing the non-scalar data as temporal data defined in metadata associated with the column.

3. The method of claim 2, wherein recognizing further includes resolving the temporal data as a data type for one of: data period data type, time period data type, and timestamp data type.

4. The method of claim 3, wherein converting further includes selecting a conversion algorithm based on the data type.

5. The method of claim 1, wherein converting further includes producing the first x-value and the second x-value into numbers of a predefined floating point length.

6. The method of claim 1, wherein producing further creating the line segment so as to be parallel to the x-axis.

7. The method of claim 1, wherein generating further includes determining the fixed height based on a total number of column indexes for a database associated with the column data.

8. The method of claim 1, wherein inserting further includes using an R-tree insertion algorithm to insert the MBR into the R-tree spatial index.

9. The method of claim 1 further comprising, overlaying, by the processor, the R-tree spatial index onto an existing index associated with a database having the column data.

10. A system that includes one or more processors configured to:
    determine a beginning and an ending data point in time for column data associated with a column of data stored in a database, including non-scalar data recognizable as temporal data also stored in the database;
    convert the beginning data point into a first x-value for an x-axis and the ending data point into a second x-value for the x-axis;
    produce a line segment for the first x-value and the second x-value at a particular height for a y-axis;
    generate a minimum bounding rectangle (MBR) from the line segment, the MBR having a fixed height assigned to a y-value for the y-axis; and
    insert the MBR into an R-tree spatial index.

11. The system of claim 10, wherein the determining further comprises recognizing the non-scalar data as temporal data defined in metadata associated with the column.

12. The system of claim 11, wherein the recognizing further comprises resolving the temporal data as a data type for one of: data period data type, time period data type, and timestamp data type.

13. The system of claim 12, wherein the converting further comprises selecting a conversion algorithm based on the data type.

14. The system of claim 10, wherein the converting further comprises producing the first x-value and the second x-value into numbers of a predefined floating point length.

15. The system of claim 10, wherein the producing further comprises creating the line segment so as to be parallel to the x-axis.

16. The system of claim 10, wherein the generating further comprises determining the fixed height based on a total number of column indexes for a database associated with the column data.

17. The system of claim 10, wherein the inserting further comprise using an R-tree insertion algorithm to insert the MBR into the R-tree spatial index.

18. The system of claim 10, wherein the one or more processors are further configured to overlay the R-tree spatial index onto an existing index associated with a database having the column data.

19. A non-transitory computer readable storage medium storing at least executable computer code that when executed:
    determines a beginning and an ending data point in time for column data associated with a column of data stored in a database, including non-scalar data recognizable as temporal data also stored in the database;
    converts the beginning data point into a first x-value for an x-axis and the ending data point into a second x-value for the x-axis;
    produces a line segment for the first x-value and the second x-value at a particular height for a y-axis;
    generates a minimum bounding rectangle (MBR) from the line segment, the MBR having a fixed height assigned to a y-value for the y-axis; and
    inserts the MBR into an R-tree spatial index.

20. The non-transitory computer readable storage medium of claim 19, wherein the determining further comprises recognizing the non-scalar data as temporal data defined in metadata associated with the column.

21. The non-transitory computer readable storage medium of claim 20, wherein the recognizing further comprises resolving the temporal data as a data type for one of: data period data type, time period data type, and timestamp data type.

22. The non-transitory computer readable storage medium of claim 21, wherein the converting further comprises selecting a conversion algorithm based on the data type.

23. The non-transitory computer readable storage medium of claim 19, wherein the converting further comprises producing the first x-value and the second x-value into numbers of a predefined floating point length.

24. The non-transitory computer readable storage medium of claim 19, wherein the producing further comprises creating the line segment so as to be parallel to the x-axis.

25. The computer readable storage medium of claim 19, wherein the generating further comprises determining the fixed height based on a total number of column indexes for a database associated with the column data.

26. The non-transitory computer readable storage medium of claim 19, wherein the inserting further comprise using an R-tree insertion algorithm to insert the MBR into the R-tree spatial index.

27. The non-transitory computer readable storage medium of claim 19, wherein the executable code when executed further overlays the R-tree spatial index onto an existing index associated with a database having the column data.

* * * * *